(12) United States Patent
Reynolds

(10) Patent No.: US 10,771,930 B1
(45) Date of Patent: Sep. 8, 2020

(54) MOBILE BROADCAST/RECEIVER DEVICE AND SYSTEM

(71) Applicant: Steven Reynolds, Chicago, IL (US)

(72) Inventor: Steven Reynolds, Chicago, IL (US)

( * ) Notice: Subject to any disclaimer, the term of this patent is extended or adjusted under 35 U.S.C. 154(b) by 0 days.

(21) Appl. No.: 16/297,681

(22) Filed: Mar. 10, 2019

Related U.S. Application Data

(60) Provisional application No. 62/651,456, filed on Apr. 2, 2018.

(51) Int. Cl.
| | | |
|---|---|---|
| *H04W 24/00* | (2009.01) | |
| *H04W 4/06* | (2009.01) | |
| *H04W 4/021* | (2018.01) | |
| *G06F 3/14* | (2006.01) | |
| *G06F 3/0484* | (2013.01) | |

(52) U.S. Cl.
CPC .............. *H04W 4/06* (2013.01); *G06F 3/14* (2013.01); *H04W 4/022* (2013.01); *G06F 3/04847* (2013.01)

(58) Field of Classification Search
CPC H04W 4/06; H04W 4/022; G06F 3/14; G06F 3/04847

USPC ........................................................ 455/456.3
See application file for complete search history.

(56) References Cited

U.S. PATENT DOCUMENTS

| | | | | |
|---|---|---|---|---|
| 8,781,622 B2* | 7/2014 | Mockus | ................ | G06Q 20/18 700/237 |
| 9,048,880 B2* | 6/2015 | Batada | ................ | H04B 5/0031 |
| 9,853,719 B2* | 12/2017 | Krochmal | ............... | H04B 7/26 |
| 10,003,936 B1* | 6/2018 | Novotny | ................ | H04W 4/12 |
| 2015/0055564 A1* | 2/2015 | Alam | .................... | H04W 52/22 370/329 |
| 2015/0350811 A1* | 12/2015 | Fernandez | ............. | H04W 4/90 455/41.2 |

* cited by examiner

*Primary Examiner* — Amancio Gonzalez

(57) ABSTRACT

A mobile broadcast/receiver device contains a transmitter that transmits user information locally, a receiver that receives locally transmitted information, memory to store information transmitted and received, a microprocessor or other logic to filter the received information to be relevant either to the information being broadcast by the user or according to the user's interests as provided by the user, and a display to present the filtered information to the user. The mobile broadcast device optionally communicates with location reference devices and/or other positioning devices, other broadcast devices, or other mobile devices such as mobile broadcast devices.

23 Claims, 12 Drawing Sheets

MY INFO

| | | 210 | 220 | | 250 | 20m |
|---|---|---|---|---|---|---|
| 205 — SEX | M ☐ | | | | | |
| | F ☐ | Y | N | | | |

| 205 — FIRST NAME: | ● | ○ |
| 210 — FN | | |

| 205 — LAST NAME: | ○ | ● |
| 210 — LN | | |

| 205 — COMPANY: | ● | ○ |
| 210 — MY COMPANY | | |

| 205 — TITLE: | ● | ○ |
| 210 — MY TITLE | | |

| 205 — JOB FUNCTION: | ○ | ● |
| 210 — MY FUNCTION | | |

| 205 — NEEDS: | ○ | ● |
| 210 — MY NEEDS | | |

| 205 — INTERESTS: | ● | ○ |
| 210 — MY INTERESTS | | |

| 205 — AFFILIATION: | ● | ○ |
| TEAM M | | |

$T_X$ — 280
SPREAD SPECTRUM ☐
SINGLE ■
900 Hz

$R_X$ — 290
AUTO DETECT FREQUENCY ☐
SINGLE ■
900 Hz
SPREAD SPECTRUM ☐

SEND RATE ☐ — 295
USER RATE ☐ — 297

270

---

230 — FILTER    240 — CONTROL    CUSTOM

| | Y | N | |
|---|---|---|---|
| SEX | ○ | ● | ○ |
| FIRST NAME | ○ | ● | ○ |
| LAST NAME | ○ | ● | ○ |
| COMPANY | ○ | ○ | ● — "MY COMPANY" |
| TITLE | ○ | ○ | ● ENGINEER OR ANALYST |

ON ■ OFF ☐
☐ — 299

FIG. 2A

| MY INFO | Y | N | | |
|---|---|---|---|---|
| | | | 250 | 100m |

205 → COMPANY NAME: ●
  SALES TECH ← 210

205 → COMPANY TYPE: ●
  COMPUTER SUPPLIER
  210

205 → PRODUCT OFFERED: ●
  LAPTOP ←
    210

205 → PRICE: ●
  $ 1,000 ←
    210

$T_X$
FREQUENCY SPREAD ■
SINGLE ☐
900 Hz $R_X$
AUTO DETECT FREQUENCY ■
SINGLE ☐
900 Hz
SPREAD SPECTRUM ☐

SEND RATE ☐
USER RATE ☐

270

$S_T$

FILTER

ON ☐ OFF ■

FIG. 2B

MOBILE BROADCAST/RECEIVER DEVICE AND SYSTEM

CROSS-REFERENCE TO RELATED APPLICATIONS

This application claims priority from U.S. Provisional Application No. 62/651,456, filed on Apr. 2, 2018.

BACKGROUND OF THE INVENTION

The Internet provides a wealth of information to users, much of which can be accessed with mobile devices. Through websites, software, or other applications (e.g., "apps") users can customize the type of information they would like to receive. This can be done through internet natural language, keyword, or Boolean searching or by creating a personal account with a website that disseminates a desired type or category of information. Often users are interested in obtaining information about people, products, services, and other relevant inquiries in their local vicinity. Certain software and applications are designed to provide the user information based upon the user's location. Some examples are google maps, retail apps (e.g., grocery stores, electronics outlets, or clothing boutiques), service apps (e.g., hotels, restaurants, or service and repair company), or social media apps that run on secure platforms. However, such software and apps are primarily driven by user specific requests or provider-based advertising algorithms instead of information broadcast by a user with the intent that information the user enters will be used to filter or sort response information.

BRIEF SUMMARY OF THE INVENTION

The present invention relates to a mobile broadcast/receiver device. In one aspect, the mobile broadcast/receiver device allows a user to broadcast user information to the public in a local area by sending packets containing user information as well as a broadcast identification. In another aspect, the mobile broadcast/receiver device receives transmissions in the form of other local broadcasts, transmissions directed to the user, or other information transmitted locally. In another aspect, the mobile broadcast/receiver device includes a processing system that filters the received information for information relevant to the information being broadcast by the user, such as for example, by displaying that information to the user based upon matching grades of categories of substantive information on the user's profile or based upon the user's interests as provided by the user. In another aspect, the mobile broadcast/receiver device communicates with local reference points and/or other positioning devices to determine the location of the user and/or to broadcast that location locally. In another aspect of the invention, the mobile device is configured to set up a secure connection or handshake connection (which may be secure or encrypted or may not be secure or encrypted but instead, for example, be transmitted over a specific frequency, using specific headers identifying the information to be sent back and forth, or modulated in a different way than the other broadcast or transmissions) with one or more devices after initiating a connection via the broadcast signal.

In one aspect of the invention, the mobile broadcast/receiver device exchanges information with other local devices without the need of establishing a secure connection. For example, the mobile broadcast/receiver device may broadcast personal user information over a set distance or location-area; for example, it may broadcast the name, title, and company of the user, along with location the user's location. "Personal information" shall include personal information of an individual or information specific to any legal "person," such as a corporation, partnership, or other corporate or unincorporated entity. It can also include a local shared profile, which may include a single piece of information or a collection of information a user wishes to share while the user is present in a given vicinity or locale.

As another example, a retailer that seeks to transmit information related to goods or services the retailer sells could send out personal information, company information, goods or services information, or a local shared profile. In yet another example, the mobile broadcast/receiver device may broadcast information related to goods or services the person would like to receive, or a person for whom the user is looking. Generally, the aforementioned information is not the type that would be kept a secret. However, in another aspect, the mobile broadcast/receiver device is configured to form a secure connection with another mobile device such that more sensitive or non-public information can be exchanged. In another aspect, the mobile broadcast/receiver device controls power to the transmitter to control the range over which the information is transmitted. One example would include a user adjustment interface, in which the user can adjust the coverage area using the mobile broadcast/receiver devices or another input device connected to it using an infographic display. In a preferred embodiment, transmission would be limited to local areas, such as, for example, an area that encompass the particular building, outdoor area, city block, or stadium in which the user is located. In another aspect, the mobile broadcast/receiver device receives information broadcast from a similar mobile broadcast device or from any other type of mobile device. One example would include a user relational system in which user information is compared against other broadcast information based upon personal-preference based criteria that has a multivariate relationship with transmission data. The user relational system can be located on the mobile broadcast/receiver device or on another website or networked device. The user relational system can be static or updated; e.g., based upon changing profiles or other data amalgamating system that is local or remote.

BRIEF DESCRIPTION OF THE DRAWINGS

FIG. 2A shows one embodiment of the send settings screen of the GUI of the present invention.

FIG. 2B shows another embodiment of the send settings screen of the GUI of the present invention.

DETAILED DESCRIPTION OF THE INVENTION

Figure 1A:
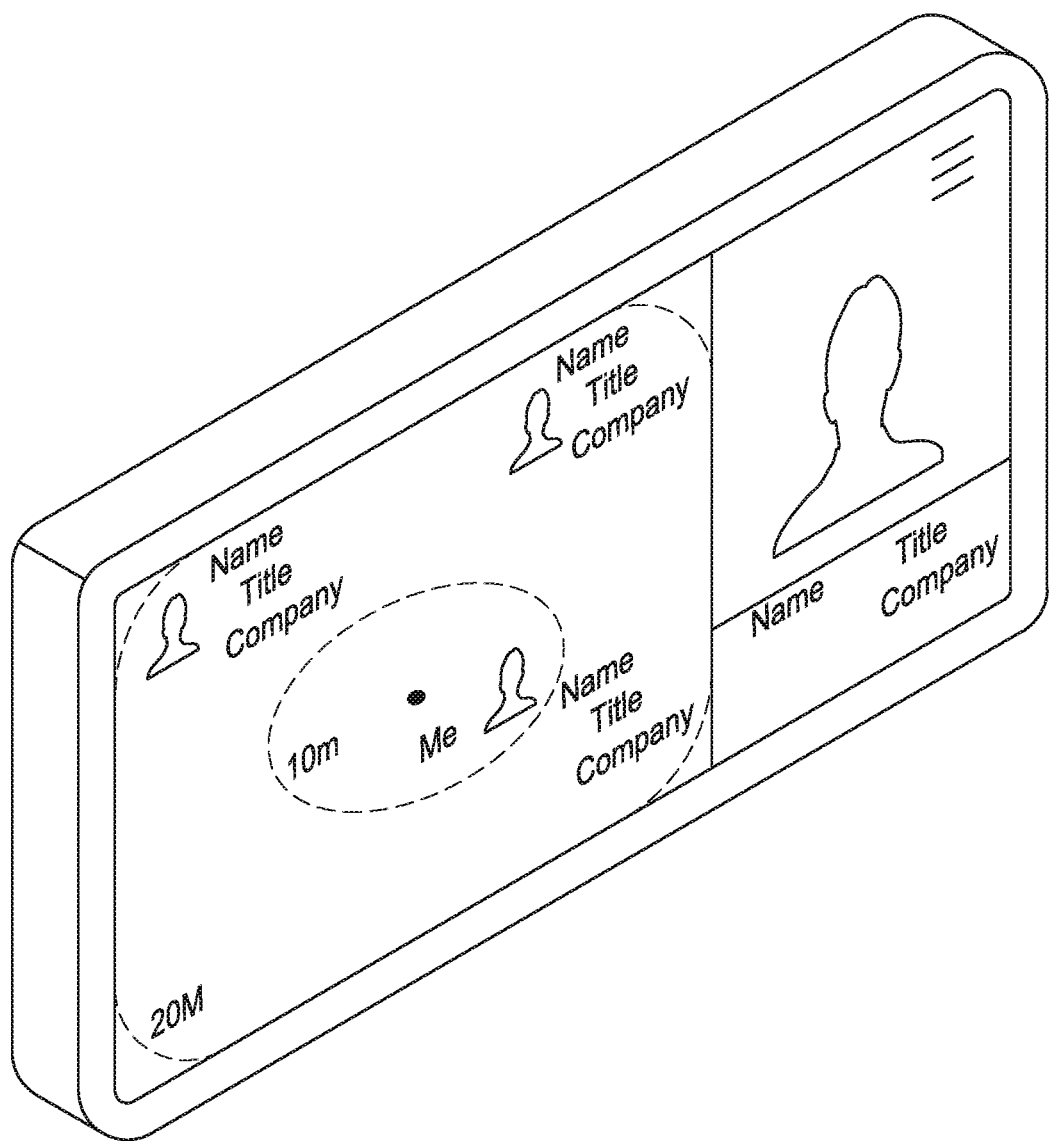
FIG. 1A is an isometric view of one embodiment of the present invention.
Figure 1B:
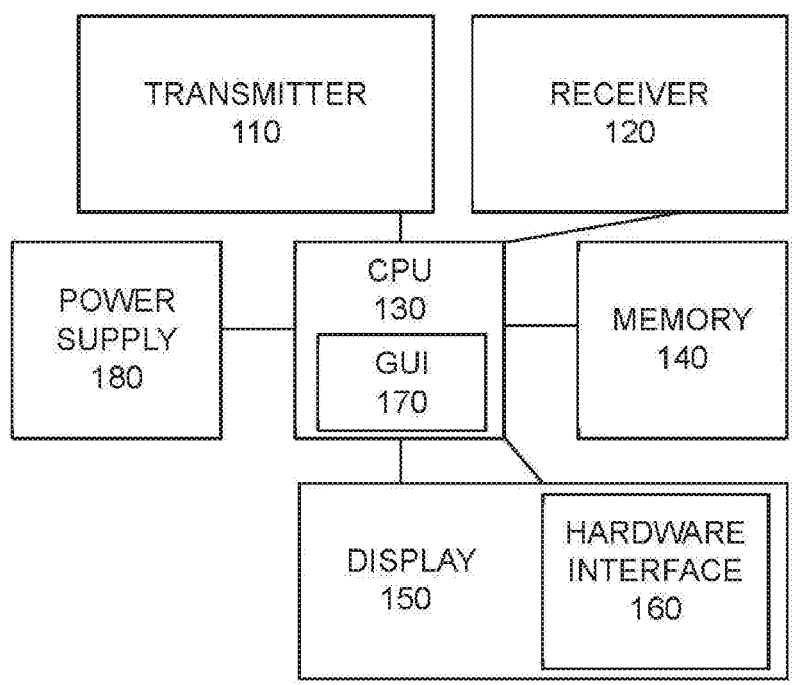
FIG. 1B is a block diagram of the components of one embodiment of the present invention.

FIG. 1A shows an isometric view of one embodiment of the present invention. FIG. 1B shows block diagram of one embodiment of a mobile broadcast/receiver device 100. It contains a transmitter 110, receiver 120, CPU 130, memory 140, display 150, and GUI 170. The transmitter 110 is preferably a radio transmitter that transmits message packets wirelessly. The receiver is preferably a radio receiver that receives message packets wirelessly. The CPU preferably contains one or more digital microprocessors or field programmable gate arrays (FGPAs) and memory, but can be comprised or any kind of digital or analog logic devices. The display 150 is preferably a standard mobile display, such as those used on mobile phones.

The CPU 130 is electrically connected ("connected" meaning directly or indirectly, intermittently or continuously) to the transmitter 110, receiver 120, memory 140, display 150, hardware interface 160, and power supply 180 (which is preferably a rechargeable battery). The transmitter is connected to a power supply (not shown). In one embodiment, the transmission power is controlled by the CPU based upon user inputs through the GUI. In another embodiment, the transmission power would be adjusted by a user adjustment interface in which the user adjusts the coverage area using the mobile broadcast/receiver devices or another input device connected to it by a rendered infographic display. Transmission power can be controlled or modulated using any known method of controlling broadcast transmission power. The CPU 130 runs a GUI 170. In one embodiment, the CPU function is separated into at least a baseband processor to manage the communication functions of the mobile broadcast/receiver device and a control processor to manage the remaining functions of the mobile broadcast/receiver device.

A user inputs broadcast information to be broadcast using the GUI 170. A user also inputs settings on the type of information the user would like to see via the GUI. The CPU 130 processes the inputs to form a profile and passes profile information from the user to the GUI into memory 140. Profile information is preferably stored digitally, but can also be received via the GUI and/or stored in analog format. Known digital modulation and demodulation techniques or off-the-shelf analog-to-digital (ADC) or digital-to-analog (DAC) converters can be used. The CPU passes broadcast information from the memory to the transmitter for transmission as a signal. The signal is preferably a radio signal where the profile is split up into one or more message packets. The receiver receives information transmitted by other devices, preferably as a radio signal containing message packets. The signal transmitted by the receiver is preferably, but not necessarily, compatible with the receiver without modification. Alternatively, the CPU can be programmed with software (e.g., a driver, object code, assembly code, application programming interface (API), or any other coding language or process) or other hardware logic added to the mobile broadcast/receiver device, to allow the CPU to decode or demodulate further transmission types that would otherwise not be compatible with the mobile broadcast/receiver device.

The transmitter 110 contains a modulator to convert the broadcast data received from the CPU 130 into an electromagnetic signal for transmission. The profile information is prepared for transmission using known modulation techniques. Some known modulation techniques include pulse amplitude modulation (PAM), quadrature amplitude modulation (QAM), amplitude-shift keying (ASK), on-off keying (OOK), phase-shift keying (PSK), binary phase-shift keying (BPSK), differential phase shift keying (DPSK), quadrature phase-shift keying (QPSK), differential QPSK, offset QPSK, pi-4 QPSK, frequency-shift keying (FSK), minimum phase-shift keying (MSK), Gaussian minimum shift keying (GMSK), continuous phase frequency shift keying (CPFSK), orthogonal frequency-division multiplexing (OFDM), wavelet modulation, spread spectrum techniques (e.g., direct-sequence spread spectrum, chirp spread spectrum or frequency-hoping spread spectrum), multiple frequency-shift keying (MFSK), automatic digital modulation, I/Q modulation, digital baseband modulation, or other known method such as, for example, any other amplitude modulation, frequency modulation, phase modulation, pulse modulation, or transpositional modulation technique. The encoder may also convert profile data into a specified format, generally using an encoding algorithm. For example, the mobile broadcast/receiver device may use unipolar, polar, bipolar, nonreturn to zero-level, nonreturn to zero inverted, pseudoternary, Manchester, differential Manchester, B8ZS, HDB3, or any other known coding technique. It will be understood that coding is optional, and that in other embodiments, the mobile broadcast/receiver device may transmit information without encoding. Each message packet preferably includes a sender ID and any information necessary to demodulate or decode the message. The receiver 120 contains a demodulator for demodulating the electromagnetic signal and converting the message packets into data readable by the CPU. Known demodulation techniques may be used, such as for example, the inverse of one or more of the modulation techniques described above. The receiver is preferably capable of scanning various frequencies or other transmission bands for information compatible with the receiver that can be decoded by the receiver, including separate packets that may be distributed across multiple frequencies or bands. The transmitter is preferably capable of broadcasting on a single frequency or transmission band or by sending separate packets or messages across multiple frequencies or bands. These capabilities are well known in the art through, as one example, standards setting organizations for fixed or mobile communications.

The hardware interface 160 is preferably a virtual or physical keyboard. It may also be an input port that connects via a wire, or wirelessly, to any other type of input device. Additionally or alternatively, the hardware interface may be any device capable of inputting information into an electronic device, such as, for example, a microphone and speech recognition software or connection, via the transmitter 110 and receiver 120 to a PC or wireless access point, which transmits and receives information entered by a user, such as, for example, through a web application.

GUI 170 is preferably displayed on a touch screen that doubles as the display 150. The GUI may also be installed using hardware buttons, switches, or any other hardware or software device that allows a user to input information into the GUI.

In one embodiment, the GUI 170 includes a send settings screen, a device view screen, an incoming profile view screen, a heat map screen, and an individual connection setup screen.

Figure FIGS. 2A and 2B show exemplar embodiments of the send settings screen 200 with two different sets of exemplar inputs. FIG. 2A shows an exemplar profile of an individual, which includes personal information. FIG. 2B shows an exemplar profile of a company seeking to sell a product. FIG. 2B may correspond to a retailer (including, for example, an automatic algorithm or matching process associated with the retailer) that analyzes broadcast profiles such as that shown in FIG. 2A; determines based upon the "Title," "Job Function," "Needs," and/or any other type of information a user chooses to broadcast that the user may require a new laptop computer; and responds by broadcasting the profile shown in FIG. 2B. The retailer may expect that the user with the profile shown in FIG. 2A would have a filter that picks up the profile set forth in 2B. Alternatively, the retailer could send a connection request, as discussed in connection with FIG. 8 below.

GUI 170 preferably displays user information categories 205 that either are preinstalled on the device, are transmitted to the device as a template, or that the user inputs through hardware interface 160. The GUI also preferably includes user input information fields 210 related to each user input information, into which the user types or inputs information. The user input information fields can be text entry boxes, image stores, dropdown menus, radio button selections, prepopulated sets from profiles input to the device (via the receiver or a hardware input, not shown). The GUI preferably gives the user options as to which information to broadcast via broadcast control fields 220. This selection can be discrete (e.g., yes or no) or it can be a separate entry similar to input fields 210. The receiver filter setting categories can be for example preinstalled, transmitted to the device as a template, or input by a user through hardware interface 160.

The GUI 170 preferably includes filter categories 230 that either come preinstalled on the device, are transmitted to the device as a template, or that the user inputs through hardware interface 160. The GUI also preferably includes receiver filter control fields 240 related to each receiver filter setting category. In the embodiment shown in FIG. 2A, the user has excluded profiles of users that work for "MY COMPANY" by using the Boolean operator "-." Thus user has selected to include profiles of other individuals who have the title of "Engineer" or "Analyst." The receiver filter control fields can be text entry boxes, image stores, dropdown menus, radio button selections, prepopulated sets from profiles input to the device (via the receiver or a hardware input port, not shown). Additionally the filter preferably can be set to exclude information or profiles that do not meet a certain strength (or closeness) level, which the user sets either via a numerical (e.g., 1-100%) or graphical (1-5 stars) level using a filter strength input 299.

The GUI 170 preferably includes a transmission power control 250 by which a user controls the power to and/or transmission range of the transmitter. In a preferred embodiment, the CPU contains a transmission power database or map that lists estimated distances for various power levels. The GUI preferably uses that information, provided by the CPU, to give the user of the mobile broadcast/receiver device the ability to control transmission, such as, for example, by distance; e.g., 20 meters, 40 meters, 120 meters, etc.

The GUI 170 preferably includes an avatar section 270 in which a user can upload or otherwise transmit or create an avatar (e.g., through the receiver 120 or other hardware input port (not shown)). The information or image input to the avatar section is preferably stored by the CPU as part of the profile. The GUI also preferably includes transmitter settings 280 and receiver settings 290. The transmitter settings allow the user to set, for example, a communication frequency over which to broadcast the user's profile. Alternatively, the user may select a "spread spectrum" to broadcast over two or more frequencies (e.g., Frequency-hopping spread spectrum (FHSS), direct-sequence spread spectrum (DSSS), time-hopping spread spectrum (THSS), chirp spread spectrum (CSS), and combinations of these techniques are forms of spread spectrum.) The receiver settings allows a user to control which frequencies are monitored by the receiver. The user may set a single frequency, set the receiver to autodetect frequencies by scanning that a range of frequencies (range input not shown) for message packets that are compatible, and/or may set a spread spectrum frequency using the techniques mentioned above.

In another embodiment, the GUI 170 includes send rate settings 295 and listen rate 297 settings. The send rate settings allow a user to control how often his or her profile is broadcast. In one example the send rate settings are input using a text box or pulldown menu in which a user can set how often, in seconds, the profile is sent. The listen rate settings are similar and input similarly but control how often the receiver is powered up to detect compatible incoming messages.

In another embodiment, the mobile broadcast/receiver device serves as an electronic business card that is publicly broadcast over a limited area. As one example, if a user is attending an industry convention at which many other individuals have similar publicly broadcast electronic business cards, the user may wish to filter broadcast information to block all transmissions from users that broadcast information showing that they are members of the same company as the user—in this case "My Company." The user blocks that information by indicating that any transmission that contains a company user input field that contains the words "My Company" should be blocked. The user can do this with, for example, a Boolean character "-" indicating NOT that information. Similarly, the user can choose to view only those transmissions in which the Title field includes either "engineer" or "analyst."

In another example, a user may bring the mobile broadcast/receiver devices to a public market. The user may input in the user input information field 210 corresponding to the "Needs" category 205 via input field 210 (as shown in FIG. 2A) something along the lines of "looking for Product X version Y." The user may set a filter so that only messages received containing text corresponding to "Laptop" and/or "Computer" are displayed, in response to which, a received profile such as that shown in FIG. 2B would be filtered for display. In another example, if the user is only interested in perusing individuals and not products, the user could set a pattern matching filter so that only profiles with similar categories are displayed. Examples of pattern matching, fuzziness, and search queries are described below. The pattern matching system may, for example, display a non-exact match. For example, considering the profile shown in FIG. 2A, a pattern matching system may display a profile containing the following user information categories: "Male/Female," "Name," "Company and Title." In another example, the user may set a pattern matching filter to display only profiles containing user information categories similar to, or that exactly match, the user information categories 205 contained in one or more of the user's profile. In another example, the user may set a pattern matching filter to only receive profiles containing user input information fields containing information similar to, or that exactly match, that in one or more of the user's user input information fields 210. It will be understood that these are a few examples of creating filters to insure that user-relevant information is displayed to the user. Any other known filter, adaptive filter, or software can be used to coordinate receipt and display of relevant information. For example, Boolean searching algorithms, natural language searching algorithms, neural networks, and/or other information filtering technology can be used to create determine levels of matches between various types of information, categories, or profiles. One example would include a user relational system in which user information is compared against other broadcast information based upon personal-preference based criteria that has a multivariate relationship with transmission data (e.g., is not merely a one-to-one correspondence, such as male-to-male or female-to-male).

In a preferred embodiment, the mobile broadcast/receiver device is designed to automatically coordinate the type of information received with the type of information transmitted. For example, the CPU preferably contains logic to display only information that relates at or above some threshold level to that the user transmits. In one example, the CPU automatically excludes information that contains marketing hallmarks such as "buy one get one free," where a listed price or prices consist of more than 10% of the message payload, where registered or known business names populate the message, or where sender IDs or locations identify local beacons known to be positioned within retail locations. As another example, the CPU can use a neural net, or learning technology to filter out messages that match non-preferred profiles (e.g. those that contain too many exclamation points, profane language, or other characters).

Along with the foregoing, a broadcast profile can optionally include a local shared profile, which includes a single piece of information or a collection of information a user wishes to share while the user is present in a given vicinity or locale or set of vicinities or locales.

Figure 3:
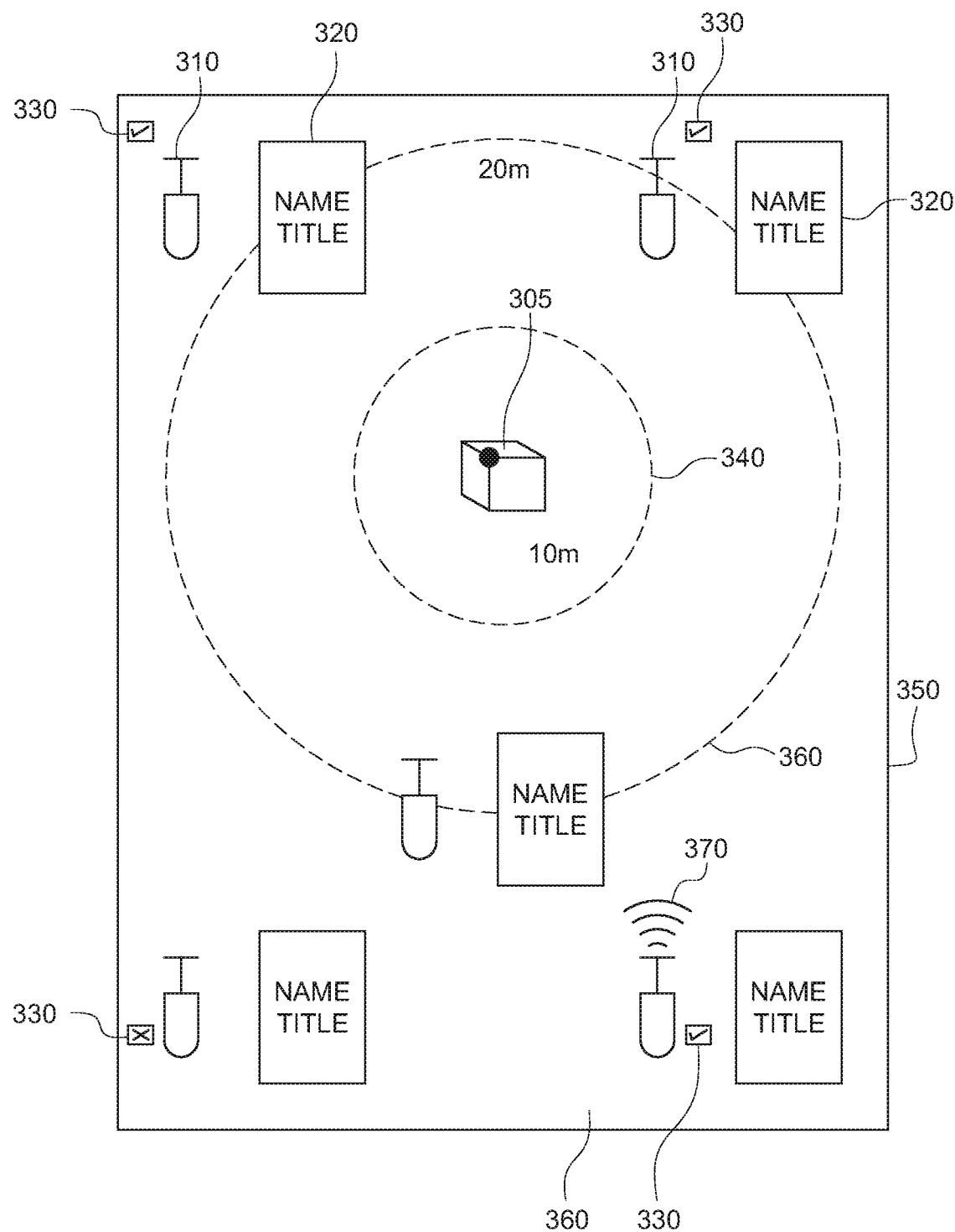
FIG. 3 shows an embodiment of the device view screen of the GUI of the present invention.

FIG. 3 shows an embodiment of the device view screen 300 of the GUI 170. The device view screen preferably displays the user's mobile broadcast/receiver device as an icon 305 along with other transmitting device icons 310, summary information sections 320 (including information about profiles being transmitted 320), and/or transmission indicator icons 330 (showing whether information being transmitted is compatible with, and thus can be decoded by, the mobile broadcast/receiver device). Further, the device view screen preferably displays information in infographic form (e.g., a form that combines text or numeric information with graphics or graphic text). In another embodiment, summary information sections 320 display images such as, for example, photos or avatars of the various owners of the transmitting devices. In another embodiment, the device view screen shows signal strength 370 associated with one or more local transmitting devices. In another embodiment, the device view screen includes distance indicators (340, 360) in which the relative distances between the mobile broadcast/receiver device and the various other transmitting devices can be seen. In one embodiment, the distances are shown radially by discrete circles of, for example, 10 meters, 20 meters, etc. But it will be understood than any means of showing relative locations can be used based upon the information available. If other transmitting devices send coordinate locations, those relative locations can be shown, or the distances can be calculated by resolving the coordinates into a coordinate frame and calculating a vector between the two.

Alternatively, the receiver can calculate distance based upon received signal strength (RSS) or radio tomographic imaging (RTI), which are both well known. See for example, U.S. Pat. No. 8,710,984 B2, which is incorporated herein by reference. Precision can be increased if the transmitting devices transmit location information, such as profiles, messages, or message components indicating the strength at which they are broadcasting. This allows the mobile broadcast/receiver device to adjust distance estimates up for higher power transmissions or down for lower power transmissions. Other location information may include last known GPS coordinates, GPS coordinates, intertial reference systems (INS), the RSS or RTI information calculated by the transmitting device, or a combination of one or more of foregoing. For example, the mobile broadcast/receiver device may use last known GPS coordinates (before losing the GPS signal by entering a building) plus the intertial coordinates measured following loss of the GPS signal to determine absolute location. The mobile broadcast/receiver device may transmit that information and/or receive that information from other user devices to calculate relative locations between the mobile broadcast/receiver device and the other user devices. As another example, the mobile broadcast/receiver device may transmit RSS or RTI results along with information used to calculate those results and/or receive that information from other user devices to coordinate information. In this example, the mobile broadcast/receiver device may transmit RSS and expected location of nearby devices transmitting the measured signals and compare those values to the RSS and expected location of nearby devices transmitting the signals measured by another user's device to determine relative location. The mobile broadcast/receiver device may also identify the RTI system it used or how to obtain location information from the same RTI system. Alternatively, the mobile broadcast/receiver device may sign into or connect to a location device located within its receiver's range for the purpose of identifying itself and request the identification with the expectation that other user devices will do the same and transmit such information back and forth either in conjunction with or separate from the location device within the mobile broadcast/receiver device's receiving range.

Figure 4:
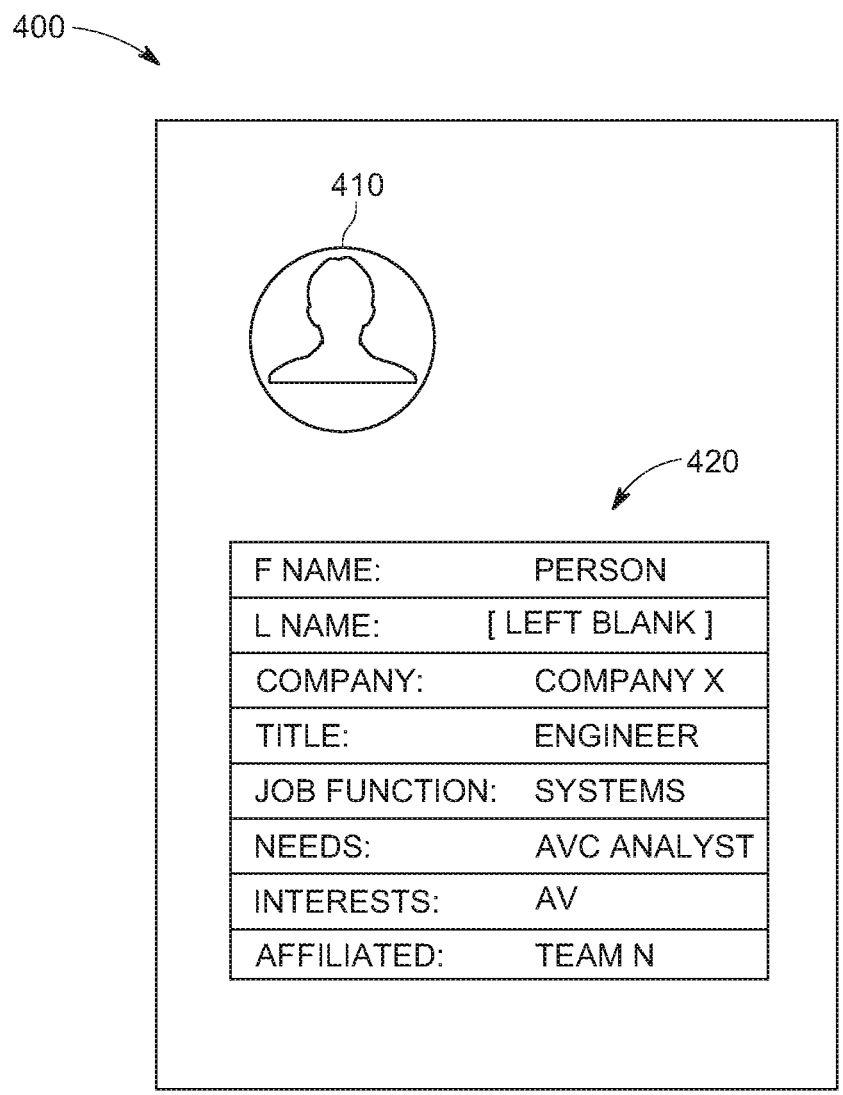
FIG. 4 shows one embodiment of an incoming profile screen of the GUI of the present invention.

FIG. 4 shows one embodiment of an incoming profile screen 400, which contains, in one embodiment, an avatar and local third-party information 420. Local third-party information 420 can include, for example, first name, last name, company, title, job function, needs, interests, affiliations, and any other personal information capable of being broadcast. In one embodiment, the incoming profile screen is accessed by a user selecting (such as by touching on a touchscreen) one of the other transmitting device icons 310, summary information profiles 320, transmission indicator icons 330 shown in FIG. 3, or any other display information related to a profile. In another embodiment, the user scrolls through profiles one at a time, such as, for example, by swiping left or right on the display. The order of display may be set by a user to be in order of overall relevance based upon profile comparisons, relevance based upon comparison between single categories, by distance from the mobile broadcast/receiver device, or by other means determined by the user and input into GUI settings (not shown) via the hardware input device 160. Relevant comparisons may be determined by, for example, any number of image or text pattern matching, text searching, fuzziness searching or query methods such as, for example, U.S. Pat. Nos. 5,706, 497A, 7,870,117 B1, and 8,065,307 B2, which are incorporated herein by reference.

The mobile user device of the preferred embodiment is capable of sending and receiving unsecured information using known transmission standards—some of which may have to be modified to become unsecured—such as, for example, broadcast AM or FM radio, microwave communication, Wi-Fi, Bluetooth, Bluetooth Low Energy, NFC, Zigbee, WiMax, IrDA, technologies listed by the Institute of Electrical and Electronics Engineers (IEEE) for machine-to-machine (M2M) communication (e.g., IEEE 802 technologies). The unsecured transmission allows the user to transmit information within a local area without need of establishing a secure connection, conducting a handshake, or logging into an application or website. The user's privacy is secured by controlling the transmission power to cover a set location and controlling what specific information is sent in unsecured fashion. These functions may be utilized along with encrypted or secured transmissions as well, but the preferred embodiment provides a certain level of user information to, colloquially speaking, whoever is listening. The preferred embodiment allows a user a large level customization in controlling the type of information received so as to prevent a deluge of information and/or inappropriate communications. For example, the user may use the receiver filter control fields to limit display of information to text or, for example, to limit display of information to only certain types or formats of information.

Figure 5:
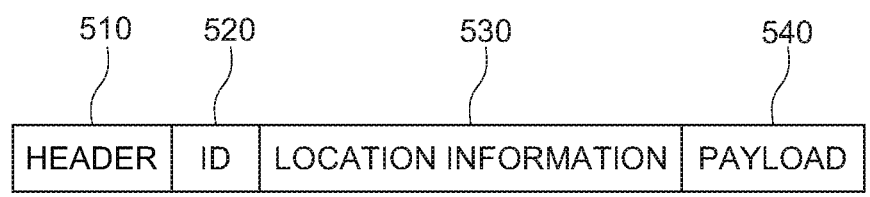
FIG. 5 shows a diagram of the message contentions of one embodiment of the present invention.

Referring to FIG. 5, the messages 500 transmitted by the transmitted preferably include at least a header 510, ID 520, location information 530, and payload 540. In this embodiment, the header identifies the beginning of the message; the ID identifies the mobile broadcast/receiver device sending the message; and the location information provides information related to the location of the broadcasting device. Location data may be in the form of objective location data, such as from GPS, via local reference points such as a location beacon placed locally, or via reference to a receiving device that sends back information from which the mobile broadcast/receiver device can determine relative location. Such relative location information may be determined by, for example, monitoring strength of signal received from the a beacon or other transmitting device and comparing that to the transmission power of the transmitting device, if it is provided. One example includes a duplex geo-coordination system by which two devices communicate back-and-forth or via other form of shared information to determine location in a relative (e.g., polar coordinates or vector coordinates between devices) and/or objective sense (e.g., longitude and latitude). The payload preferably contains the information desired to be broadcast. It will be understood that the message transmitted may contain some or all of the parts shown in FIG. 4, as some may be omitted, or any other portions that can be transmitted across the chosen medium without undue delay or bandwidth being used.

The mobile broadcast/receiver device is configured to receive messages formatted similarly to the messages it transmits. But, given that many wireless transmissions are the subject of industry standards, one the mobile broadcast/receiver device may also be configured to receive and interpret any known transmitted signal or message.

Figure 6:
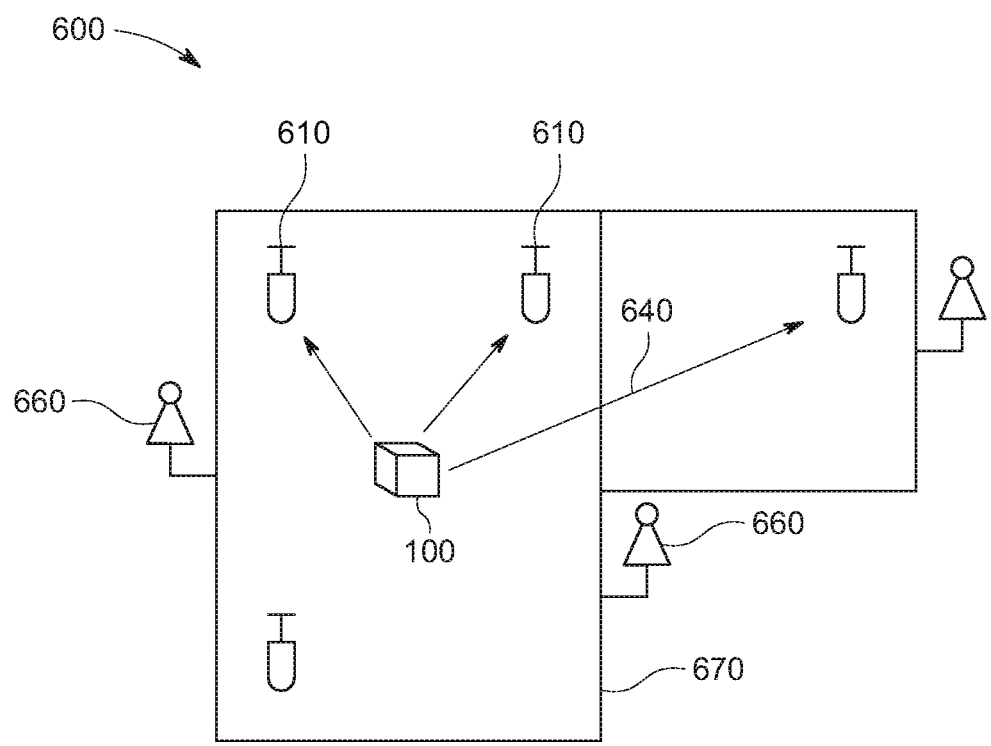
FIG. 6 shows an embodiment of the mobile broadcast/receiver device of the present invention when it is in use at an establishment that contains one or more transmitting devices.

FIG. 6 shows an embodiment of the mobile broadcast/receiver device 100 in use at an establishment that contains one or more transmitting devices 610. In one embodiment, the mobile broadcast/receiver device and transmitting devices may be located in the vicinity of establishment beacons 660. For all purposes of this disclosure, it will be understood that the transmitting devices 610 can be, but need not be, mobile broadcast/receiver devices according to the present invention.

In one embodiment, the establishment beacons determine the location or position of the mobile broadcast/receiver device and the other transmitting devices using known methods such as, for example, those disclosed in U.S. Pat. Nos. 8,710,984 B2 and 7,904,244 B2, which are incorporated herein by reference. In one embodiment, the transmitter 110 and receiver 120 of the mobile broadcast/receiver device are configured to communicate with one or more of the establishment beacons to determine its relative or objective position. In a related embodiment, one or more of the establishment beacons contain a floor plan or area map that can be transmitted for display on the mobile broadcast/receiver device, over which the location of the various transmitting devices 610 can be overlaid.

Figure 7A:
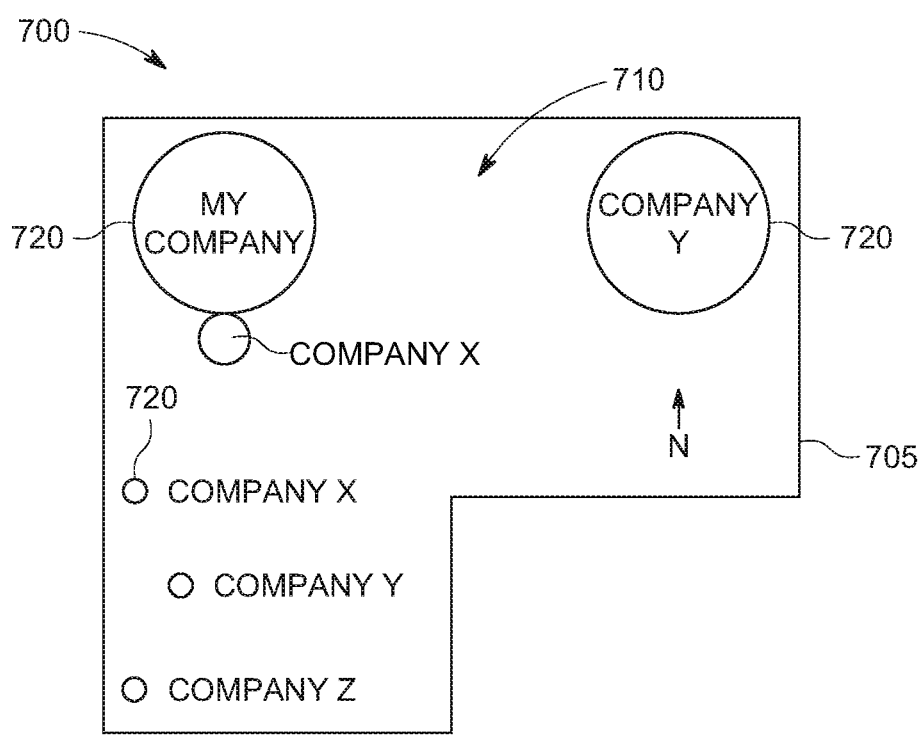
FIG. 7A shows one embodiment of a heat map screen of the GUI of the present invention.
Figure 7B:
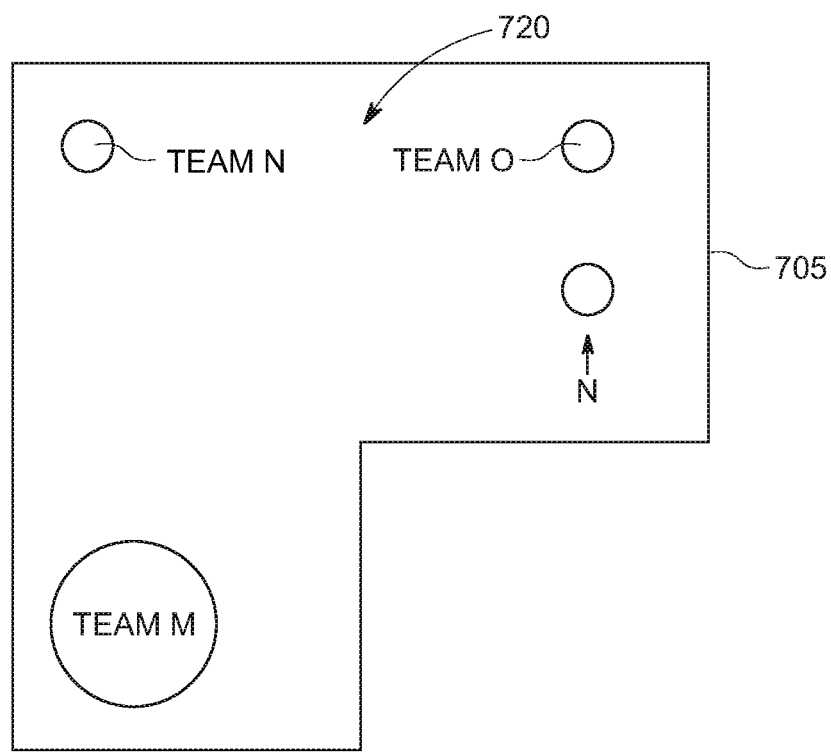
FIG. 7B shows another embodiment of a heat map screen of the GUI of the present invention.

FIGS. 7A and 7B show two embodiments of the heat map screen 700 of GUI 170 corresponding to establishment 705. In one embodiment, GUI 170 allows the user to select or define heat map screens using hardware interface 160. For example, as shown in FIG. 7A, the user has selected a size-based heat map of transmitting devices organized by company 710. This exemplar display contains indicators 720 (such as circles) for each company. As shown in FIG. 7A, a relatively large amount of individuals in the north-west corner of the establishment identify with "My Company." In one embodiment, the size of the indicator corresponds to the number of devices in a particular area that match each company description. In another embodiment, as shown in FIG. 7B, the user has selected a heat map by affiliation 720. As can be seen in FIG. 7B, a relatively large amount of individuals located in establishment 705 are affiliated with "Team M" as compared to "Team 0" or "Team N." It will be understood that heat maps may include any type of relative or objective display of information in a textual, graphical, tabular, or mixed media presentation. For more complex categories that may not contain exact matches or may only contain a few exact matches, such as "Needs," the heat map may be populated by considering not only the number of matches but the closeness of matches. For example, in one embodiment, the CPU multiplies the number of matches by a ranking index based upon pattern matching each of the available profiles with the user's profile. As an example, consider that the north-west corner of the establishment contains transmitters broadcasting the following information associated with the "company" category: (1) "My Company, LLC"; (2) "My Company Holding Corp"; and (3) "Company X." The pattern matching system may count the (1)-numeral as 1 match(es) to "My Company" at 66.7%, the (2)-numeral as 1 match(es) to "My Company" at 50.0%, and the (3)-numeral as 1 match to "Company X" at 100%. Thus, the overall rank for "My Company" in the north-west corner would equal 1.17 (1*0.667+1*0.50), and the overall rank for "Company X" would be 1.0 (1*1.0). Thus, in this example, the circle for "My Company" shown in the north-west corner of the GUI display would be 1.17 times as large as the circle for "Company X" (1.17/1.0).

Figure 8:
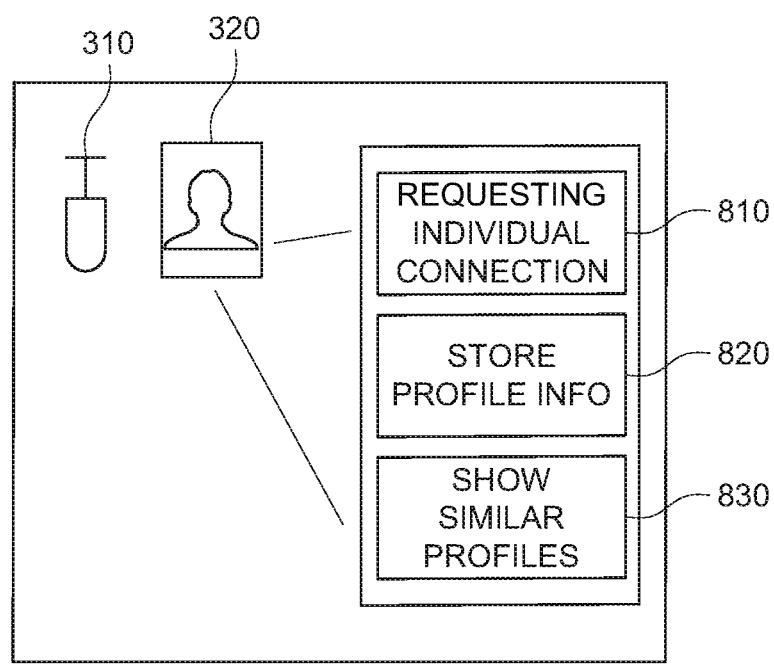
FIG. 8 shows one embodiment of the individual connection setup screen of the GUI of the present invention.

FIG. 8 shows one embodiment of the individual connection setup screen 800 of the GUI 170. A user accesses this screen by, for example, selecting a displayed profile. In one example, the user selects (e.g., by long-pressing on a touch-screen) one of the other transmitting device icons 310, summary information profiles 320, transmission indicator icons 330, or any other display information related to a profile (such as those shown in FIG. 3). The GUI then displays a dialog box that gives the user certain options with respect to the selected transmitting device. In one embodiment those options include sending a request for an individual connection (810) to the transmitting device the user previously selected, storing in memory of the mobile broadcast/receiver device the profile associated with the transmitting device the user previously selected (820), and/or requesting that the mobile broadcast/receiver device conduct a pattern-matching or fuzziness search for profiles that are similar to that of the selected transmitting device (830). Once the selected transmitting device accepts the request for an individual connection, a secure connection can be established allowing two-way communication to exchange location information back-and-forth using known standard for device connections, including but not limited to, Bluetooth, P2P networking, or redirection to social networking sites using user input or APIs to establish connections through those sites.

Figure 9:
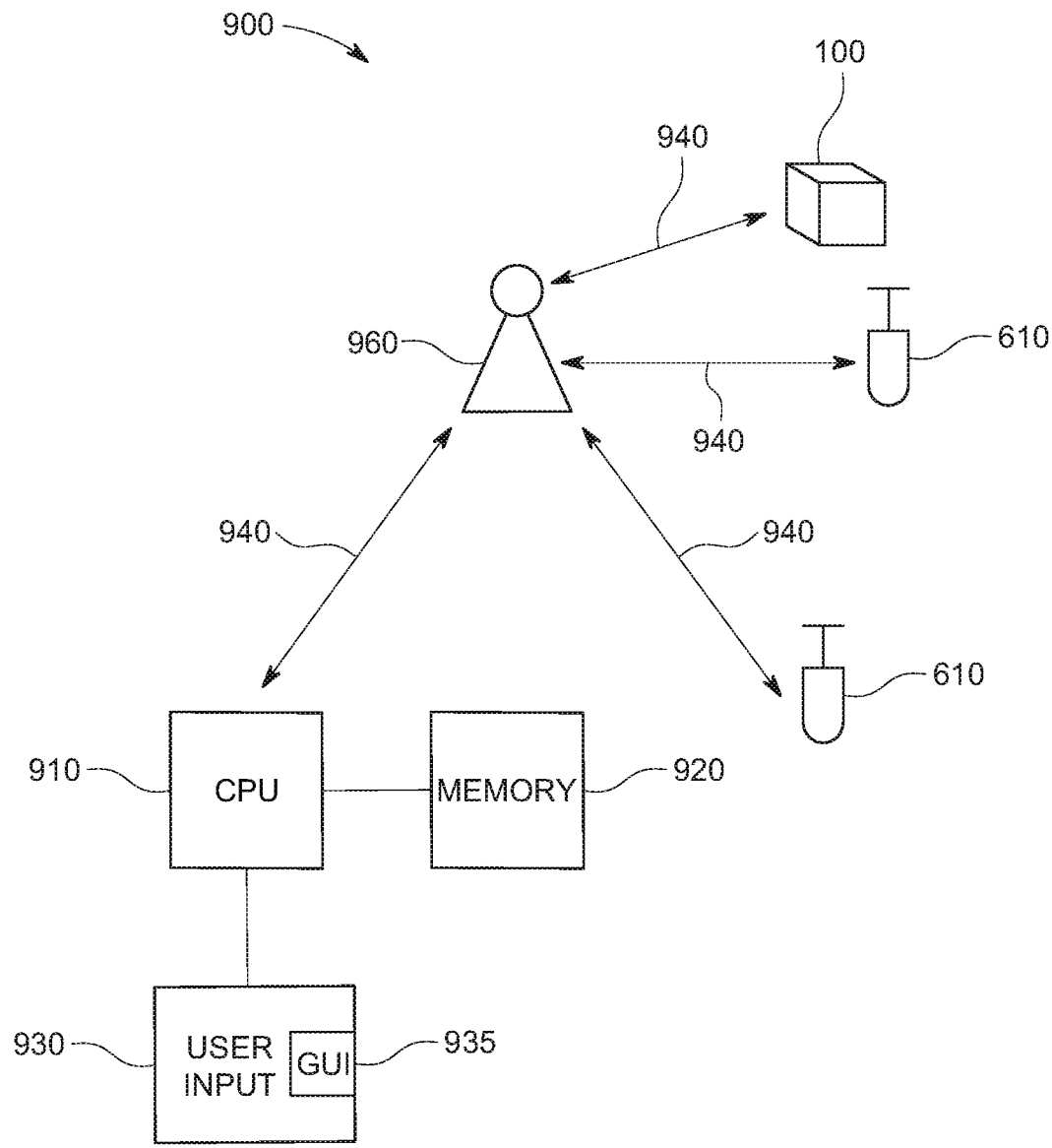
FIG. 9 is a diagram of a simulation environment of the present invention.

In another embodiment, as shown in FIG. 9, the environment in which the mobile broadcast/receiver device and one or more other transmitting devices 610 operate could also be simulated via an establishment intermediary system. As shown in FIG. 9, the establishment intermediary system 900 includes an establishment intermediary beacon 960, which contains a CPU 910, memory 920, and user input device 930, which preferable includes a GUI 935. The establishment intermediary beacon preferably establishes one or more, single-device connections 940 with each transmission device, including the mobile broadcast/receiver device. The connections are preferably secure, using a number of known encryption or security technologies, such as, for example a secure Wi-Fi connection or Bluetooth connection. Each of the transmission devices and the mobile broadcast/receiver device preferably operate as disclosed in connection with FIGS. 1-8, except that instead of being broadcast generally over the local area the broadcast messages (containing profile information) are sent to the establishment intermediary beacon. If the establishment intermediary beacon determines that the messages (or profile information) are acceptable, it retransmits that information to all other transmitting devices and/or the mobile broadcast/receiver device over the respective single-device connections. In other words, instead of being actually broadcast publicly, the message packets transmitted from the mobile broadcast/receiver device are sent securely to the establishment intermediary beacon 960, which then transmits that same message across every single-device connection to create an effectively public broadcast to all devices in the area. All transmissions from each transmission device are handled this way, through the intermediary beacon.

In one embodiment, the establishment intermediary system can be controlled by a user, such as the establishment proprietor through the user input 930 containing a proprietor GUI 935. For example, the proprietor may input filter requirements in the proprietor GUI that requires devices to register to use its system and/or may require that transmitting devices and/or the mobile broadcast/receiver device send verifiable location information to ensure that such device is located on the proprietor's premises.

It will be understood, that hardware and software components can be distributed or combined in various ways. The foregoing discussion describing such components is not limited to any physical arrangement or distribution of logical function. For example, all processing could take place in a single microprocessor or could be distributed across multiple processors, including cloud or network processors. Similarly, any single function could be run by a single identifiable processor or could be parallel processed or distributed across multiple local or networked processors.

What is claimed is:

1. A mobile broadcast/receiver device, comprising:
   a display;
   a memory connected to the display;
   a user input connected to the memory configured to receive personal information to be stored in the memory;
   a transmitter configured to broadcast the user personal information as transmitted personal information, at least initially without forming an individual connection with another device for the purpose of broadcasting the transmitted personal information;
   a receiver configured to receive incoming personal information of a person other than the user, at least initially without forming an individual connection with another device for the purpose of receiving the incoming personal information; and
   a filter configured to filter the incoming personal information using personal-preference based criteria as a reference; wherein the mobile broadcast/receiver device is configured to display to the user in infographic form the filtered incoming personal information of a person other than the user.

2. The mobile broadcast/receiver device of claim 1, wherein the mobile broadcast/receiver device broadcasts personal information over a pre-set area wherein the preset area is defined by information received at the user input.

3. The mobile broadcast/receiver device of claim 1, wherein a transmission range of the mobile broadcast/receiver is set by a user using a setting that controls power to the transmitter.

4. The mobile broadcast/receiver device of claim 1, further comprising a location receiver configured to receive location information from a transmitting device that transmits the incoming personal information.

5. The mobile broadcast/receiver device of claim 4, wherein the location receiver is a location transmitter/receiver configured to exchange location information with a transmitting device to determine relative location between the transmitting device and the mobile broadcast/receiver device.

6. The mobile broadcast/receiver device of claim 1, wherein the display is configured to display in infographic form information received from a transmitting device along with location information that identifies the location of the transmitting device.

7. The mobile broadcast/receiver device of claim 1, wherein the mobile/broadcast receiver device is further configured to obtain data from a local reference point such as a location beacon placed within the transmission area of the broadcast/receiver device.

8. A mobile broadcast/receiver system, comprising:
   a display means;
   a memory means connected to the display for storing information;
   a user input means connected to the memory for accepting user personal information;
   a transmitter means for broadcasting the user personal information as transmitted personal information, at least initially without forming an individual connection with another device for the purpose of broadcasting the transmitted personal information;

a receiving means for receiving incoming personal information of a person other than the user, at least initially without forming an individual connection with another device for the purpose of receiving the incoming personal information; and a filtering means for filtering the incoming personal information for display to the user based upon user settings input at the user input means along with the user personal information; wherein the mobile broadcast/receiver system displays to the user in infographic form the filtered incoming personal information of a person other than the user.

9. The mobile broadcast/receiver system of claim 8, wherein the mobile broadcast/receiver system broadcasts personal information over a pre-set area wherein the preset area is defined by information received at the user input.

10. The mobile broadcast/receiver system of claim 8, wherein a transmission range of the mobile broadcast/receiver is set by a user using a setting that controls power to the transmitter.

11. The mobile broadcast/receiver system of claim 8, further comprising a location receiver configured to receive location information from a transmitting device that transmits the incoming personal information.

12. The mobile broadcast/receiver system of claim 11, wherein the location receiver is a location transmitter/receiver configured to exchange location information with a transmitting device to determine relative location between the transmitting device and the mobile broadcast/receiver device.

13. The mobile broadcast/receiver system of claim 8, further comprising a means for displaying in infographic form information received from a transmitting device along with location information that identifies the location of the transmitting device.

14. The mobile broadcast/receiver system of claim 8, further comprising a means for obtaining data from a local reference point such as a location beacon placed within the transmission area of the broadcast/receiver device.

15. A method of filtering incoming information broadcast over a local area, comprising:

publicly broadcasting user personal information input by a user and stored in memory, at least initially without forming an individual connection with another device for the purpose of broadcasting the user personal information;

receiving incoming information broadcast over a local area and storing it in memory, at least initially without forming an individual connection with another device for the purpose of receiving the incoming information;

filtering the incoming information broadcast over a local area based upon user choices stored in memory; and displaying to the user in infographic form the filtered incoming information.

16. The method of claim 15, further comprising the step of broadcasting personal information over a pre-set area wherein the preset area is defined by information received at the user input.

17. The method of claim 16, further comprising the step of receiving location information from a transmitting device that transmits the incoming information.

18. The method of claim 15, further comprising the step of exchanging location information with a transmitting device to determine relative location of the transmitting device.

19. The method of claim 15 further comprising the step of displaying information received from a transmitting device along with location information that identifies the location of the transmitting device.

20. The method of claim 19, further comprising the step of displaying the information received from the transmitting device along with the location information in infographic form.

21. The method of claim 15 wherein the broadcast user personal information is not secured or encrypted.

22. The method of claim 15, wherein the filtering step comprises use of a pattern matching algorithm.

23. The method of claim 15, further comprising the step of obtaining data from a local reference point such as a location beacon placed within the transmission area of the broadcast/receiver device.

\* \* \* \* \*